United States Patent [19]
Izod et al.

[11] Patent Number: 5,213,745
[45] Date of Patent: May 25, 1993

[54] METHOD FOR REMOVAL OF SPINNING SOLVENT FROM SPUN FIBER

[75] Inventors: Thomas P. Izod, Basking Ridge; Morris B. Berenbaum, Summit, both of N.J.; Morton H. Litt, University Heights, Ohio

[73] Assignee: Allied-Signal Inc., Morris Township, N.J.

[21] Appl. No.: 803,860

[22] Filed: Dec. 9, 1991

[51] Int. Cl.⁵ .............................................. D01F 13/04
[52] U.S. Cl. .................................. 264/203; 264/211.16
[58] Field of Search ............................ 264/203, 211.16

[56] References Cited

U.S. PATENT DOCUMENTS

| | | |
|---|---|---|
| 2,509,279 | 5/1950 | Sisson . |
| 3,737,392 | 6/1973 | Ameen et al. . |
| 4,334,102 | 6/1982 | Decker et al. .................... 568/621 |
| 4,344,908 | 8/1982 | Smith et al. ........................ 264/203 |
| 4,413,110 | 11/1983 | Kavesh et al. ................... 526/348.1 |
| 4,440,711 | 4/1984 | Kwon et al. .................... 264/203 X |
| 4,455,273 | 6/1984 | Harpell et al. ................. 264/203 X |
| 4,536,536 | 8/1985 | Kavesh et al. ....................... 524/462 |
| 4,551,296 | 11/1985 | Kavesh et al. ................... 264/203 X |
| 4,713,290 | 12/1987 | Kwon et al. ........................ 428/364 |
| 4,883,628 | 11/1989 | Kwon et al. .................... 264/178 F |

FOREIGN PATENT DOCUMENTS

| | | |
|---|---|---|
| 64167 | 11/1982 | European Pat. Off. . |
| 3004699 | 10/1987 | Fed. Rep. of Germany . |
| 1100497 | 1/1968 | United Kingdom . |
| 2051667 | 1/1981 | United Kingdom . |

Primary Examiner—Leo B. Tentoni

[57] ABSTRACT

This invention relates to a process for removal of spinning solvents from solution spun fibers by extraction with an extraction solvent such as a polyether.

24 Claims, 1 Drawing Sheet

FIG. 1

METHOD FOR REMOVAL OF SPINNING SOLVENT FROM SPUN FIBER

BACKGROUND OF THE INVENTION

1. Field of the Invention

This invention relates to a process for removal of spinning solvents from solution spun fibers. More particularly, this invention relates to a process for extraction of a spinning solvent from solution spun fiber in which the solution is spun into a coagulation or gelation liquid.

2. Prior Art

The preparation of fibers through gel spinning and solution spinning process are known. For example, U.S. Pat. Nos. 4,413,110, 4,455,273, 4,536,536, 4,551,296 describes a process in polyolefin fibers having a molecular weight equal to or greater than 500,000. In these processes, a hot dilute solution (2-30%) of a polyolefin in a relatively non-volatile solvent such as an aliphatic or aromatic hydrocarbon as for example mineral oil, paraffin oil, decalin, poly(ethylene) wax or mixtures thereof is spun. The spun hot solution is cooled forming a gel or coagulate fiber. The resultant gel or coagulate fiber is extracted with another solvent which extracts the spinning solvent and replaces it in the fiber, and is then dried. The fiber is stretched at one or more stages during the process to provide a dried fiber having the desired tenacity and modulus.

Kalb and Penning in Polymer Bulletin, vol. 1, pp. 87914 80 (1979), Polymer, 2584-90 (1980) and Smook et al. in Polymer Bull., vol. 2, pp. 775-83 (1980) describe a process in which the polyethylene is dissolved in a non-volatile solvent (paraffin oil) and the solution is cooled to room temperature to form a gel. The gel is cut into pieces, fed to an extruder and spun into a gel filament. The gel filament is extracted with hexane to remove the paraffin oil, vacuum dried and then stretched to form the desired fiber.

U.S. Pat. Nos. 4,440,711, 4,713,290, and 4,883,628 describe processes for the gel spinning fibers formed from polymers formed from vinyl alcohol and acrylonitrile. Polymer of a molecular weight of over 500,000 is spun as a dilute solution (2-15%) in a relatively non-volatile solvent such as glycerin, dimethylsulfoxide, dimethylformamide, and ethylene carbonate. The resultant solvent is extracted with a volatile solvent such as methanol and water, the extracted fiber is dried. Upon stretching at one or more stages during the process, fibers of tenacity above 5 g/denier and modulus above 100 g/denier are produced.

Zwick et al. in *Soc Chem Ind, London,* Monograph No. 30, pp. 188-207 (1968) describe the spinning of poly(vinyl alcohol) by a Phase Separation technique said to differ from earlier Wet Spinning, Dry Spinning and Gel Spinning techniques. The reference indicates that the earlier systems employ 10-20% , 25-40% and 45-55% polymer concentrations, respectively, and that they differ in the manner in which low molecular weight materials (solvents such as water) are removed. The reference also indicates some earlier systems to be restricted in spinneret hole size, attenuation permitted or required, maximum production speed and attainable fiber properties.

The Phase Separation process described in Zwick et al. (see also UK Patent Specification 1,100,497) employs a polymer content of 10-25% (broadly 5-25% in the Patent which covers other polymers as well) dissolved at high temperatures in a one or two-component solvent (low molecular weight component) system that phase separates on cooling. This phase separation took the form of polymer gelation and solidification of the solvent (or one of its components), although the latter is indicated in the Patent to be optional. The solution was extruded through apertures at the high temperature through unheated air and wound up at high speeds hundreds or thousands of times greater than the linear velocity of the polymer solution through the aperture. Thereafter the fibers were extracted to remove the included or exterior solvent phase, dried and stretched. An earlier, more general description of Phase Separation Spinning is contained in Zwick *Applied Polymer Symposia,* no. 6, pp. 109-49 (1967).

Modifications in the spinning of hot solutions of ultrahigh molecular weight poly(ethylene) (see Examples 21-23 of UK 1,100,497) have been reported by Smith and Lemstra and by Pennings and coworkers in various articles and patents including German Offen 3004699 (Aug. 21, 1980); UK Application 2,051,667 (Jan. 21, 1981); *Polymer Bulletin,* vol. 1, pp. 879-880 (1979) and vol. 2, pp. 775-83 (1980); and *Polymer* 2584-909 1980).

The Zwick et al article states the poly(vinyl alcohol) content of 10-25% in the polymer solution to be optimal, at least in the system explored in most detail where the solvent or a component of the solvent solidified on the cooling to concentrate the poly(vinyl alcohol) in the liquid phase on cooling before the poly(vinyl alcohol) gels. Unlike the systems used in the Kavesh et al applications and Smith and Lemstra patents, all three versions of Zwick's Phase Separation process take up the fiber directly from the air gap, without a quench bath, such that the draw-down occurred over a relatively large length of cooling fibers.

U.S. Pat. No. 4,771,616 relates to an apparatus and method for extraction of a material from a running length of fiber. This method comprises continuously moving the fiber through a conduit while simultaneously flowing a solvent for the material through the conduit with the conduit having a length and cross sectional area sufficient to facilitate extraction of the desired amount of the material. The flow is preferred to be countercurrent to the movement of the fiber.

A prior method to extract mineral oil from polyethylene solution spun fiber and a method to manufacture such fiber is disclosed in U.S. Pat. No. 4,413,110 hereby incorporated by reference. A process to purify both the solvent and the mineral oil for recycle and/or reuse is disclosed in pending U.S. Ser. No. 811,123 filed Dec. 19, 1985, hereby incorporated by reference. A prior art method for treatment of filamentary materials in a tube is found in U.S. Pat. No. 2,509,279.

U.S. Pat. No. 4,334,102 describes a method for removing liquid hydrocarbons from polyether solvents such as dimethyl ether of polyethylene glycol. The method comprises the steps of mixing the solution with an aqueous salt solution, removing at a low temperature an organic layer containing liquid hydrocarbons, heating the remaining aqueous layer to a higher temperature where it separates into a second organic layer containing polyether solvent and an aqueous salt solution. The aqueous salt solution is cooled and recycled to mix with additional polyether solvent solution at the low temperature. The process is particularly applicable to removing liquid hydrocarbons which accumulate in recirculating polyether solvents used for absorption of acid gases from feedstocks such as natural gas, synthetic natural gas, ammonia synthesis gas and refinery gas.

SUMMARY OF THE INVENTION

One aspect of this invention relates to a process of extracting a material from a fiber which comprises the steps of;

(a) extracting a continuous length of a fiber containing a first solvent with a second solvent at a first temperature, $T_1$, said second solvent selected such that said first solvent is soluble or substantially soluble in said second solvent at said first temperature $T_1$ and is insoluble or is substantially insoluble in said second solvent at a second temperature, $T_2$, for a sufficient contact time to form a solution of said extracted first solvent in said second solvent and a fiber containing said second solvent, which fiber is free or substantially free of said first solvent and of substantially indefinite length;

(b) subjecting said solution to said second temperature, $T_2$, for a time sufficient to form a heterogenous mixture comprising two distinct liquid phases, a first liquid phase comprising predominantly said first solvent and a second liquid phase comprising predominantly said second solvent;

(c) separating said first and second liquid phases; and (d) recycling said second phase to said extraction step.

Yet another aspect of this invention relates to an improved gel spinning process of the type which comprises the steps of forming a solution of a polymer of fiber forming molecular weight in a first spinning solvent; extruding said solution through an aperture, said solution being at a spinning temperature upstream of said aperture which is greater than the temperature at which a rubbery gel forms and being substantially at the first concentration both upstream and downstream of said aperture; cooling the solution adjacent to and downstream of the aperture to a second temperature below the temperature at which a rubbery gel is formed, forming a gel containing first solvent of substantially indefinite length; extracting the gel containing said first solvent with a second solvent for a sufficient contact time to form a fibrous structure containing said second solvent, which structure is substantially free of said first solvent and is of substantially indefinite length; drying the fibrous structure containing said second solvent to form a xerogel of substantially indefinite length free of said first and second solvent; and stretching at least one of the gel containing the first solvent, the fibrous structure containing the second solvent and the xerogel, the improvement comprising the steps of;

(a) extracting said gel containing said first solvent with a second solvent at a first temperature, $T_1$, said second solvent selected such that said first solvent is soluble in or substantially soluble in said second solvent at said first temperature and is insoluble or is substantially insoluble in said second solvent at a second temperature, $T_2$, for a sufficient contact time to form a fibrous structure containing predominant said second solvent;

(b) subjecting said solution to said second temperature, $T_2$, to form a heterogeneous liquid mixture comprising two distinct liquid phases a first liquid phase comprising predominantly said first solvent and a second liquid phase comprising predominantly said second solvent;

(c) separating said first and second liquid phases; and (d) recycling said first liquid phase to said solution forming step and recycling said second liquid phase to said extracting step.

BRIEF DESCRIPTION OF THE DRAWINGS

The invention will be more fully understood and further advantages will become apparent when reference is made to the following detailed description of the invention and the accompanying drawings in which.

DESCRIPTION OF THE INVENTION

In the broadest aspects, this invention relates to a process for extracting the spinning solvent from polymeric fiber spun from a solution of a polymer in the solvent. In this process, a continuous length of the solvent containing fiber is contacted with another liquid which is a non-solvent for said polymer of the fiber, but which is a solvent for the spinning solvent contained in the fiber at a first temperature and which is a non-solvent for the spinning solvent at a second temperature. As used herein, a fiber is an elongated body, the length dimension of which is much greater than the dimensions of width and thickness. Accordingly, the term fiber includes a yarn, thread, filaments, both multifilament and monofilaments, [an] ends of yarn containing multiple filaments, tapes, ribbons, strips and the like having regular or irregular cross-sections; and "solvent" shall mean fluid that is liquid under process conditions and which will extract or remove in any manner that spinning liquid from the solution spun fiber.

Means for contacting the liquid containing fiber with the extracting solvent is not critical, any conventional solvent extracting means can be used. For example, the extracting solvent and fiber can be contacted by counter current techniques or co-current techniques. In the preferred embodiments of the invention, the extracting solvent and the fiber containing the spinning solvent are contacted using the apparatus and method of U.S. Pat. No. 4,771,616.

The extracting solvent and the fiber containing the spinning solvent are contacted for a time sufficient to extract all or substantially all of the spinning solvent from the fiber and to replace it with the extracting solvent. In general, the residual amount of spinning solvent remaining in the fiber after extraction is at most about 15% by weight of fiber. More preferably the amount of residual spinning solvent is less than about 5% by weight, and most preferably is less than about 1.5% by weight of the fiber.

Extraction times may vary widely and are such that the desired amount of spinning solvent is extracted. Extraction times will depend on a number of factors as for example the extraction temperature, the solubility of the spinning solvent in the extracting solvent and the like. Usually, extraction times will vary from a few minutes or seconds up to hours or days. Preferred extraction times are from about 30 seconds to about 24 hours, more preferred extraction times are from about 30 seconds to about 30 minutes and most preferred extraction times are from about 30 seconds to about 10 minutes.

The extraction solvent may vary widely provided that it is a solvent for the spinning solvent at a first temperature, $T_1$, is a non-solvent for the spinning solvent at a second temperature, $T_2$; is a non-solvent for the polymer forming the fiber at both the first temperature, $T_1$, and the second temperature, $T_2$; and has a boiling point at 670 mm of Hg greater than the highest temperature used in the conduct of the extraction process. Extraction solvents having the desired characteristics can be identified through use of solubility and boiling point studies. The extraction solvent will depend to the most significant extent on the spinning solvent. The spinning solvent will vary depending on the polymer forming the fibers. For example, in those instances where the fiber is formed from poly(vinyl alcohol) the spinning solvent is preferably aliphatic and aromatic alcohols such as hydrocarbon polyols and alkylene either polyols having a boiling point (at 101 kPa) between about 150° C. and 300° C. Such solvents include ethylene glycol, glycerin, propylene glycol, glycerol, diethylene glycol and trimethylene glycol. In those instances where the fiber is formed from poly(acrylonitrile), useful spinning solvents include dimethyl sulfoxide, dimethyl formamide, and the like. Similarly, where the polymer forming the fiber is a polyolefin, such poly(ethylene), poly(propylene) and copolymers of ethylene and propylene, spinning solvents are preferably aliphatic and aromatic hydrocarbons such as mineral oil, paraffin oil, decalin, poly(ethylene) wax and mixtures thereof. In these instances, useful extractive solvents having the desired characteristics may be identified through routine temperature/solubility studies. For example, in the preferred embodiments of the invention where the fiber is formed from a polyolefin (preferably poly(ethylene) and where the spinning solvent is a hydrocarbon preferably mineral oil, paraffin oil or decalin the extraction solvents are preferably polyether solvents such as diethylene glycol monobutyl ether and diethylene glycol monopropyl ether.

The extraction in addition to the essential boiling point and solubility characteristics, solvents for use in the preferred embodiments of the invention also exhibit a flash point (open cup) equal to or greater than about 87.8° C.; boiling point at 760 mm of Hg equal to or greater than about 190° C.; a vapor pressure at 25° C. equal to or less than about 0.4 mm of Hg and no chlorine atoms in the solvent structure.

More preferred extraction solvents are polyether solvents. Useful polyether solvents are described in U.S. Pat. No. 3,737,392.

Preferred polyether solvents are monoalkyl or dialkyl ethers of polyalkylene glycols with alkyl groups of 1 to about 5 carbon atoms and alkylene groups of 2 to about 6 carbon atoms (especially ethylene) and polyalkylene glycol groups with alkylene moieties of 2 to about 6 carbon atoms. Illustrative of such preferred solvents are:

poly(propylene glycol) molecular weight from about 425 to about 1200), tetraethylene glycol dimethyl ether(tetraglyme), triethylene glycol dimethyl ether(triglyme), diethylene glycol dimethyl ether(diglyme), diethylene glycol monobutyl ether, diethylene glycol monoethyl ether, tripropylene glycol, diethylene glycol monomethyl ether, diethylene glycol divinyl ether, diethylene glycol monoisobutyl ether, diethylene glycol dibutyl ether, diethylene glycol monopropyl ether, and propylene glycol monomethyl ether.

Preferred groups of polyether solvents are poly ethylene glycol ethers and polypropylene glycol ethers of the formulas:

$$R_3(OCH_2CH_2)_xOR^1 \text{ and } R(OCH_2CH(CH_3))_xOR^1$$

wherein x is an integer from 1 to about 8, and R and $R^1$ are the same or different and are hydrogen or alkyl having from 1 to about 4 carbon atoms; and mixtures of such glycol ethers. More preferred polyether solvents are polyethylene glycol ethers of the formula:

$$R(OCH_2CH_2)_xOR^1$$

wherein X is an interger of from about 2 to about 5, and R and $R^1$ are the same or different and are hydrogen, methyl, ethyl, propyl or butyl, with the proviso that at least one of R and $R^1$ is other than hydrogen. Most preferred solvents are tetraethylene glycol dimethyl ether, triethylene glycol dimethyl ether, diethylene glycol monobutyl ether and diethylene glycol mono propyl ether, with diethylene glycol mono butyl ether and diethylene glycol mono propyl ether being the solvents of choice.

Useful preferred polyether solvents may be prepared by conventional methods such as by acid catalyzed polymerization of propylene oxide, ethylene oxide and mixtures of propylene oxide and ethylene oxide. Such solvents may also be obtained from commercial sources. For example, such materials can be obtained from Wyandotte Corporation under the trademark Pluracol polyethylene glycol E 200, E 300, E 400 and E 600 and Pluracol poly propylene glycol P 410; and from Dow Corporation under the tradename Polyglycol P 400. Also, glycol ethers may be obtained from Eastman Kodak e.g. EKTASOLV DP and EKTASOLV DB, from Union Carbide e.g. Butyl CARBITOL and from Oxy Chem e.g. diethylene glycol DB and diethylene glycol HB Tetraglyme may be obtained from Ferro Corp.

The polymer for the fiber may vary widely, the only requirement is that the polymer is soluble in spinning solvent and insoluble in the extraction solvent. Illustrative of useful polymers are polyamides and their copolymers such as poly(metaphenylene isophthalamide), poly(p-phenylene terephthalamide), copolyamide of 30% hexamethylene diammonium isophthalate and 70% hexamethylene diammonium adipate, copolyamide of 30% bis(amidocyclohexyl) methylene, terephthalic acid and caprolactam, poly (hexamethylene adipamide) (nylon 66), poly(6-aminohexanoic acid) (nylon 6), poly(11-aminoundecancoic acid) (nylon 11), poly(hexamethylene sebacamide) (nylon 6,10) a nd the like; polymers and copolymers formed by the polymerization of α, β-unsaturated olefins such as poly(acrylonitrile), poly(vinyl alcohol), poly(acrylic acid), polyolefins as for example poly(ethylene) and poly(propylene), copolymers of vinyl acetate and vinyl chloride; and polyesters such as poly(butylene terephthalate), poly(ethylene terephthalate) and poly(1,4-cyclohexane dimethylene terephthalate). Preferred polymers are polyamides and polymers of α, β-unsaturated monomers such as polyolefins (especially polypropylene) and poly (ethylene), poly (vinyl alcohol) and poly(acrylonitrile).

Poly(ethylene) is the polymer of choice. As used herein, the term poly(ethylene) shall mean a predominantly linear poly(ethylene) material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density poly(ethylene), poly(propylene) or poly(butylene), copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference.

The polymers are of fiber forming molecular weight. Such molecular weights for the various fiber forming polymers as well known in the art and will not be described in great detail. For example, in the case of preferred poly(ethylene), poly(propylene), poly(acrylonitrile) and poly(vinyl alcohol), suitable polymers are those having a molecular weight of at least about 150,000, preferably at least about 1,000,000, more preferably from about 1,000,000 to about 5,000,000 and most preferably from about 2,000,000 to about 5,000,000.

Solvent containing fibers for use in this invention can be conveniently prepared by gel or solution spinning techniques. Illustrative of such procedures are those described in U.S. Pat. Nos. 4,457,985; 4,137,394; 4,356,138; 4,440,711; 4,713,290; 4,551,296; 4,599,276 and 4,535,027, German Off. 3,004,699, GB 2051667; and EPA 64,167 all of which are hereby incorporated by reference. Accordingly, these processes will not be described in any great detail. Of these processes, fibers formed by the spinning processes of U.S. Pat. Nos. 4,413,110, 4,455,273, 4,536,536, 4,551,296, 4,440,771, 4,713,290 and 4,883,628 are preferred.

In these preferred processes, a suitable polymer is dissolved in a suitable non-volatile solvent usually in an amount of from about 5 to about 15% by weight of the solution, preferably from about 4 to about 10% by weight of the solution.

The fiber containing the spinning solution is extruded through a spinning aperture at a temperature no less than a first temperature upstream of the aperture at substantially the same concentration upstream and downstream of the aperture and cooling the solution adjacent to and downstream of the aperture to a second temperature below the temperature at which a rubbery gel is formed, forming a gel containing the spinning solvent of substantially indefinite length.

The first solvent should be relatively non-volatile under the processing conditions. This is necessary in order to maintain essentially constant concentration of solvent upstream and through the aperture (die) and to prevent non-uniformity in liquid content of the gel fiber or film containing first solvent. Preferably, the vapor pressure of the first solvent should be no more than 80 kPa (four-fifths of an atmosphere) at 180° C., or at the first temperature. Suitable first spinning solvents for useful polymers as for example poly(ethylene), poly(acrylonitrile) and poly(vinyl alcohol) are described above. For example, useful spinning solvents for poly(vinyl alcohol) include aliphatic and aromatic alcohols of the desired non-volatility and solubility for the polymer such as hydrocarbon polyols and alkylene ether polyols having a boiling point (at 101 kPa) between about 150° C. and about 300° C., such as ethylene glycol, propylene glycol, glycerol, diethylene glycol and trimethylene glycol. Suitable spinning solvents for polyolefins such as poly(ethylene) are hydrocarbons such as decalin, mineral oil, poly(ethylene) waxes and mixtures thereof. The solvent is preferably mineral oil. The polymer may be present in the first solvent at a first concentration which is preferably selected from a relatively narrow range, e.g. 2 to 15 weight percent, preferably 4 to 10 weight percent; however, once chosen, the concentration should not vary adjacent to the die or otherwise prior to cooling to the second temperature. The concentration should also remain reasonably constant over time (i.e. length of the fiber or film).

The temperature of the spinning solvent is chosen to achieve complete dissolution of the polymer in the first solvent. The temperature of the spinning solution is the preferably minimum temperature at any point between where the solution is formed and the die face, and must be greater than the gelation temperature for the polymer in the solvent at the first concentration. For poly(ethylene) in mineral oil at 5 to 15% concentration; the gelation temperature is approximately from about 100° C. to about 130° C. Therefore, a preferred spinning temperature for polyethylene in this solvent is from about 180° C. to about 250° C., and more preferably from about 200° C. to about 240° C. Similarly, for poly(vinyl alcohol) in glycerin at about 5 to about 15% concentration, the gelation temperature is approximately 25° to about 100° C. Therefore, a preferred spinning temperature for poly(vinyl alcohol) is between about 130° C. and about 250° C., more preferably between about 170° and about 230° C. While temperatures may vary above the spinning temperature at various points upstream of the die face, excessive temperatures causative of polymer degradation should be avoided. To assure complete solubility, a spinning temperature is chosen whereat the solubility of the polymer exceeds the first concentration and is typically at least about 20% greater. The gelation temperature is chosen whereat the first solvent-polymer system behaves as a gel, i.e., the system has a yield point and reasonable dimensional stability for subsequent handling. Cooling of the extruded polymer solution from the spinning temperature to the gelation temperature is preferably accomplished at a rate sufficiently rapid to form a gel fiber which is of substantially the same polymer concentration as existed in the polymer solution. Preferably the rate at which the extruded polymer solution is cooled from the spinning temperature to the second temperature is preferably at least 50° C. per minute.

A preferred means of rapid cooling to the gelation temperature involves the use of a quench bath containing a liquid into which the extruded polymer solution falls after passage through an air gap (which may be an inert gas). Normally, however, the quench liquid and the first solvent have only limited miscibility. For example, in the case of the preferred poly(vinyl alcohol) fiber where the spinning solvent is preferably glycerol, the quench liquid is preferably a liquid such as paraffin oil. Similarly, for the preferred poly(acrylonitrile) fiber where the spinning solvent is preferably dimethyl sulfoxide suitable quenching solvent is preferably a liquid such as a mixture of water and dimethyl sulfoxide. In the case of the most preferred poly(ethylene) fiber), there the spinning solvent is preferably a hydrocarbon (preferably mineral oil), the quench liquid is preferably water.

The preferred polyether solvents used as extracting solvents in this invention may also function as quenching liquids. For example, where the spinning solvent is substantially soluble in the extraction solvent at elevated temperature but insoluble at lower temperatures, the spun fiber can be quenched by contacting the spun fiber with the solvent at a lower temperature where the spinning solvent is insoluble in the polyether solvent and a temperature sufficiently low to quench the spun fiber. Thereafter, the fiber may be contacted with the solvent at elevated temperature to extract the spinning solvent.

Some stretching during cooling to the gelation temperature at which a gel forms is not excluded from the present invention, but the total stretching during this stage should not normally exceed 10:1. As a result of those factors, the gel fiber formed upon cooling to the second temperature consists of a continuous polymeric network highly swollen with a solvent.

If an aperture of circular cross section (or other cross section without a major axis in the plane perpendicular to the flow direction more than 8 times the smallest axis in the same plane, such as oval, Y- or X-shaped aperture) is used, then both gels will be gel fibers, the xerogel will be an xerogel fiber and the thermoplastic article will be a fiber. The diameter of the aperture is not critical, with representative apertures being between 0.25 mm and 5 mm in diameter (or other major axis). The length of the aperture in the flow direction should normally be at least 10 times the diameter of the aperture (or other similar major axis), preferably at least 15 times and more preferably at least 20 times the diameter (or other similar major axis).

If an aperture of rectangular cross section is used, then both gels will be gel films, the xerogel will be a xerogel film and the thermoplastic article will be a film. The width and height of the aperture are not critical, with representative apertures being between about 2.5 mm and about 2m in width (corresponding to film width), between about 0.25 mm and about 5 mm in height (corresponding to film thickness). The depth of the aperture (in the flow direction) should normally be at least about 10 times the height of the aperture, preferably at least about 15 times the height and more preferably at least about 20 times the height.

The extraction step is carried out at a first temperature at which the spinning solvent is soluble in the extracting solvent. The extent to which the spinning solvent is soluble in the extracting solvent may vary widely, the only requirement is that the solubility is such that the spinning solvent is extracted from the fiber to the desired extend at the first temperature. The first temperature employed will vary widely depending on the choice of spinning solvent and extracting solvent. For example, when the spinning solvent is a hydrocarbon such as mineral oil and the extracting solvent is a mono alkyl or dialkyl ether of polyalkylene glycol having alkyl groups of from 1 to about 5 carbon atoms and having alkylene and polyalkylene glycol groups where individual alkylene moieties include from about 2 to about 6 carbon atoms, such as diethylene glycol monobutyl ether and diethylene glycol monopropyl ether, first temperatures are preferably from about 55° C. to about 100° C., more preferably from about 65° C. to about 100° C. and most preferably from about 75° C. to about 100° C.

After the spinning solvent has been extracted to the desired extent (preferably less than about 15% by wgt, more preferably less than about 5.0% by wgt and most preferably less than about 1.5% by wgt of the fiber), the extracted fiber is dried using conventional drying techniques, if the extraction solvent is sufficiently volatile. However, if the extracting solvent is not sufficiently volatile, the fiber may be extracted with a washing solvent which is more volatile than the extracting solvent and which is miscible with the extracting solvent. Washing replaces the extracting solvent in the gel with the more volatile washing solvent. Suitable washing solvents include water, low molecular weight alcohols such as methanol and ethanol, low molecular weight ethers such as dimethyl ether, methyl ethyl ether, dioxane, and tetrahydrofuran, and ketones such as acetone and methyl ethyl ketone. With the preferred polyether solvents, water is the preferred washing solvent primarily for convenience.

Once the fibrous structure containing the washing or extraction solvent is formed, it is then dried under conditions where the washing or extraction solvent is removed leaving the solid network of polymer substantially intact. By analogy to silica gels, the resultant material is called herein a "xerogel" meaning a solid matrix corresponding to the solid matrix of a wet gel, with the liquid replaced by gas (e.g. by an inert gas such as nitrogen or by air). The term "xerogel" is not intended to delineate any particular type of surface area, porosity or pore size.

Stretching may be performed upon the gel fiber after cooling to a temperature equal to or less than the gelation temperature or during or after extraction. Alternatively, stretching of the xerogel fiber may be conducted, or a combination of gel stretch and xerogel stretch may be performed. The stretching may be conducted in a single stage or it may be conducted in two or more stages. The first stage stretching may be conducted at room temperatures or at an elevated temperature. Preferably the stretching is conducted in two or more stages with the last of the stages performed at a temperature between 120° C. and 150° C. Most preferably the stretching is conducted in at least two stages with the last of the stages performed at a temperature between 130° C. and 150° C. Such temperatures may be achieved with heated tubes or with other heating means such as heating blocks or steam jets.

The solution of extracting solvent and spinning solvent originally at the first temperature at which the two solvents are mutually soluble is heated or cooled to a temperature where the solvents are immiscible to form a heterogeneous two phase liquid system. One phase is a first phase comprising predominantly the spinning solvent and the other phase is a second phase comprising predominantly the extracting solvent. In general, the concentration of the predominant solvent in each phase is generally at least about 80%, preferably at least about 90%, more preferably at least about 95% and most preferably at least 99% by wgt of the phase.

The extent to which the spinning solvent is soluble in the extracting solvent may vary widely, the only requirement is that the solubility is such that the spinning solvent and the extracting solvent can be separated to the desired extent at the second temperature. The second temperature employed in any particular extraction will vary widely depending on the choice of spinning solvent and extracting solvent. For example, when the spinning solvent is a hydrocarbon such as mineral oil and the extracting solvent is a monoalkyl or dialkyl ether of a polyalkylene glycol having alkyl groups of from 1 to about 5 carbons and having alkylene and polyalkylene glycol groups where individual alkylene moieties include from about 2 to about 6 carbon atoms, such as diethylene glycol monobutyl ether and diethylene glycol monopropyl ether, second temperatures are preferably from about 0° C. to about 45° C., more preferably from about 0° C., to about 30° C. and most preferably from about 0° C. to about 25° C.

The spinning solvent phase containing less than about 20% by wgt, preferably less than about 10% by wgt, more preferably less than about 5% by wgt and most preferably less than about 2% by wgt of the phase of the extracting solvent, and the extracting solvent phase preferably containing less than about 2% by weight of the spinning solvent can be recycled to the solution forming step and extraction step, respectively. If the desired levels for recycling are not achieved, the equilibrium can be shifted by the addition of a minor (1–2%) third component (e.g. water) to the hot solution comprised of the spinning solvent and the extracting solvent. If on initial temperature promoted phase separation, the required minimum concentration levels still are not achieved, the various phases can be subjected to various other purification procedures such as distillation, solvent extraction and the like to reduce the amount of the minor component to the required levels.

Fibers prepared in accordance with the process of this invention can be used for conventional purposes for which fibers are used using conventional fiber processing techniques. For example, where the fibers formed from ultra high molecular weight linear polyethylene, such fibers can be used in the fabrication of impact resistant articles as for example those described in U.S. Pat. Nos. 4,916,000; 4,623,574; 4,403,012; 4,457,985; 4,457,985; 4,650,710; 4,681,792; 4,737,401; 4,543,286; 4,563,392 and 4,501,856.

The following examples are presented to more particularly illustrate the invention and are not to be construed as limitation thereon.

EXAMPLE I

Figure 1:
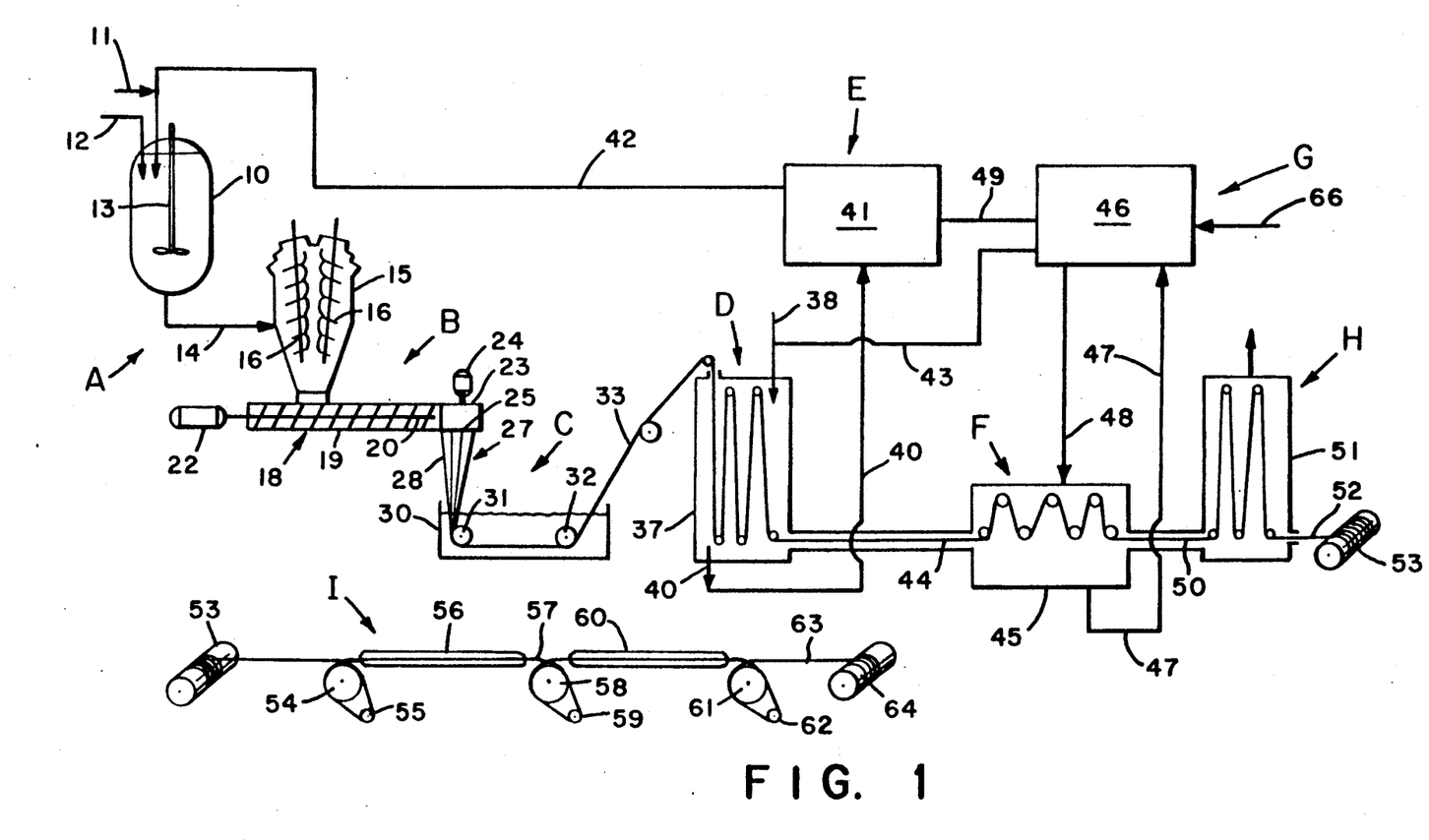
FIG. 1 is a schematic illustration of an embodiment of this invention.

FIG. 1, illustrates in schematic form a first embodiment of the present invention. In FIG. 1, a first mixing vessel 10 is shown, which is fead with an ultra high molecular weight polymer such as polyethylene of weight average molecular weight at least 500,000 and frequently at least 750,000, and to which is also fed mineral oil via fead line 12. First mixing vessel 10 is equipped with an agitator 13. The residence time of poly(ethylene) and mineral oil in first mixing vessel 10 is sufficient to form a slurry containing some dissolved poly(ethylene) and some relatively finely divided poly(ethylene) particles, which poly(ethylene)/mineral oil slurry is removed in line 14 to an intensive mixing vessel 15. Intensive mixing vessel 15 is equipped with helical agitator blades 16. The residence time and agitator speed in intensive mixing vessel 15 is sufficient to convert the poly(ethylene)/mineral oil slurry into a solution. It will be appreciated that the temperature in intensive mixing vessel 15, either because of external heating, heating of poly(ethylene)/mineral oil slurry 14, heat generated by the intensive mixing, or a combination of the above is sufficiently high (e.g. 200° C.) to permit the polyethylene to be completely dissolved in the mineral oil at the desired concentration (generally between 5 to 10 percent poly(ethylene) by weight of solution). From the intensive mixing vessel 15, the solution is fed to an extrusion device 18, containing a barrel 19 within which is a screw 20 operated by motor 22 to deliver the poly(ethylene) solution at reasonably high pressure to a gear pump and housing 23 at a controlled flow rate. A motor 24 is provided to drive gear pump 23 and extrude the poly(ethylene) solution, still hot, through a spinnerette 25 comprising a plurality of apertures, which may be circular, X-shaped, or oval-shaped, or in any of a variety of shapes having a relatively small major axis in the plane of the spinnerette when it is desired to form fibers, and having a rectangular or other shape with an extended major axis in the plane of the spinnerette when it is desired to form films. The temperature of solution in the mixing vessel 15, in extrusion device 18 and at spinnerette 25 should [all] equal or exceed a first temperature (e.g. 200° C.) chosen to exceed the gelation temperature (approximately about 100 to about 130° C.) for polyethylene in mineral oil.

The temperature may vary (e.g. about 220° C., about 210° C. and about 220° C.) or may be constant (e.g. about 220° C.) from the mixing vessel 15 to extrusion device 18 to the spinnerette 25. At all points, however, the concentration of poly(ethylene) in the solution should be substantially the same. The number of apertures, and thus the number of fibers formed, is not critical, with convenient numbers of apertures being 16, 120, 240.

From the spinnerette 25, the poly(ethylene) solution passes through an air gap 27, optionally enclosed and filled with an inert gas such as nitrogen, and optionally provided with a flow of gas to facilitate cooling. A plurality of gel fibers 28 containing mineral oil pass through the air gap 27 and into a quench bath 30 containing any of a variety of liquids, so as to cool the fibers, both in the air gap 27 and in the quench bath 30, to a second temperature at which the solubility of the poly(ethylene) in the mineral oil is relatively low, such that the poly(ethylene)/mineral oil system solidifies to form a gel. It is preferred that the quench liquid in quench bath 30 be water. While some stretching in the air gap is permissible, it is preferably less than about 10:1.

Rollers 31 and 32 in the quench bath 30 operate to feed the fiber through the quench bath, and preferably operate with little or no stretch. In the event that some stretching does occur across rollers 31 and 32, some mineral oil exudes out of the fibers and can be collected as a top layer in quench bath 30.

From the quench bath 30, the cool first gel fibers 33 pass to a solvent extraction device 37 where an extraction solvent is fed through line 38 and is maintained in device 37 at a third temperature, $T_3$. The extraction solvent is a polyether solvent which is a solvent for mineral oil at a third temperature, $T_3$, but is a non-solvent for mineral oil at a fourth temperature, $T_4$. The extraction solvent is also a solvent for water and is a non-solvent for polyethylene. The extraction solvent is preferably diethylene glycol monobutyl ether. The extraction solvent extracts the mineral oil spinning solvent from the gel fiber forming a fibrous structure containing less than about 1.5% by weight of mineral oil based on the weight of the fiber. Solvent outflow line 40 contains solution of the polyether extraction solvent and the mineral oil spinning solvent at a third temperature, $T_3$, at which the extraction solvent and spinning solvent are mutually soluble. The solution is conveyed via line 40 to solvent separator 41, where the solution is cooled to a fourth temperature at which the spinning solvent is substantially insoluble in the extraction solvent which causes the solution to separate into a phase rich in mineral oil and a phase rich in the polyether extraction solvent. Spinning solution phase is conveyed to mixer 10 by way of lines 42 and 11, and extraction solvent phase is conveyed to solvent extraction device 37 via lines 43 and 38.

Fibrous structure 44 which is conducted out of solvent extraction device 37 contains substantially only the extracting solvent and relatively little mineral oil. The fibrous structure 44 may have shrunken somewhat compared to the just gel fibers 33. Fibrous structure 44 is then conveyed to washing chamber 45 where structure 44 containing the extraction solvent is washed with a washing solvent in which the extraction solvent is soluble to remove the extraction solvent from structure 44. The washing solvent has a volatility of more than that of the extraction solvent (boiling point preferably less than about 105° C. Preferred washing solvents are low molecular weight alcohols such as methanol and ethanol, and water. The preferred washing solvent is water. Structure 44 is washed for a time sufficient to remote preferably up to 95% by wgt, more preferably up to 99% by wgt, most preferably up to 99.8% by wgt based on the original concentration of the extracting solvent) of the extraction solvent from structure 44. The solution of the washing solvent and the extraction solvent is conveyed to solvent recovery unit 46 by way of line 47 where the washing solvent and extraction solvent are separated. The washing solvent is returned to washing chamber 45 by way of line 48 and extraction solvent is returned to extraction device 37 by way of line 49. Additional extraction solvent and washing solvent can be introduced into the system by way of line 66.

Washed fibrous structure 50 is conveyed to drying device 51. In drying device 51 the washing solvent is evaporated from the fibrous structure 50, forming essentially unstretched xerogel fibers 52 which are taken up on spool 53.

From spool 53, or from a plurality of such spools if it is desired to operate the stretching line at a slower feed rate than the take up of spool 53 permits, the fibers are fed over driven feed roll 54 and idler roll 55 into a first heated tube 56, which may be rectangular, cylindrical or other convenient shape. Sufficient heat is applied to the tube 56, which may be rectangular, cylindrical or other convenient shape. Sufficient heat is applied to the tube 56 to cause the fiber temperature to be between about 120° to about 140° C. The fibers are stretched at a relatively high draw ratio (e.g. 5:1) so as to form partially stretched fibers 57 taken up by driven roll 58 and idler roll 59. From rolls 58 and 59, the fibers are taken through a second heated tube 60 heated so as to be at somewhat higher temperature, e.g. about 130° to about 160° C. and are taken up by driven take-up roll 61 and idler roll 62, operating at a speed sufficient to impart a stretch ratio in heated tube 60 as desired, e.g. 1.8:1. The twice stretched fibers 63 produced in this first embodiment are taken up on take-up spool 64.

With reference to the nine process steps of the present invention, it can be seen that the solution forming step A is conducted in mixers 13 and 15. The extruding step B is conducted with devices 18 and 23, and especially through spinnerette 25. The cooling step C is conducted in airgap 27 and quench bath 30. Extraction step D is conducted in solvent extraction device 37. Extraction solvent and spinning solvent separation step E is conducted in separation 41. Fiber washing step F is conducted in washing chamber 45. Washing solvent and extraction solvent recovery step G is carried out in solvent recovery unit 46. Drying step H is conducted in drying device 51. Stretching step I is conducted in elements 53-64 and especially in heated tubes 56 and 60. It will be appreciated, however, that various other parts of the system may also perform some stretching, even at temperatures substantially below those of heated tubes 56 and 60. Thus, for example, some stretching (e.g. 2:1) may occur within quench bath 30, within solvent extraction device 37, within washing unit 45, within drying device 51 or between solvent extraction device 37 and drying device 51.

EXAMPLE II

A sample of gel spun SPECTRA ® fiber (10.3230 gm, ca. 76% mineral oil) was extracted with 50 gm of diethylene glycol monobutyl ether at 50° C. for thirty minutes with periodic agitation. This process was repeated twice more. The fiber was then rinsed four times with ambient temperature (23°-24° C.) water (15 minutes each stage) and dried at 110° C. in a vacuum oven for 15 minutes. The weight of the dried fiber was 2.9094 gm. The residual oil in the fiber was determined to be 0.15 wt % by IR analysis.

EXAMPLE III

A sample of gel spun SPECTRA ® fiber (9.9768 gm, ca. 76% mineral oil) was extracted with 50 gm of diethylene glycol monobutyl ether at 75° C. for thirty minutes with periodic agitation. This process was repeated twice more. The fiber was then rinsed four times with ambient temperature (23°-24° C.) water (15 minutes each stage) and dried at 110° C. in a vacuum oven for 15 minutes. The weight of the dried fiber was 2.5338 gm. The residual oil in the fiber was determined to be 0.43 wt % bt IR analysis.

EXAMPLE IV

A sample of gel spun SPECTRA ® fiber (10.1228) gm, ca. 76% mineral oil) was extracted with 50 gm of diethylene glycol monobutyl ether at 100° C. for thirty minutes with periodic agitation. This process was repeated twice more. The fiber was then rinsed four times with ambient temperature (23°-24° C.) water (15 minutes each stage) and dried at 110° C. in a vacuum oven for 15 minutes. The weight of the dried fiber was 2.4337 gm. The residual oil in the fiber was determined to be 0.00 wt % by IR analysis.

Using the procedure of Examples II to IV extractions were performed with various polyether solvents at various temperatures. The residual mineral oil in the fiber was determined by IR analysis. The results and process parameters (i.e. solvent and temperature) are set forth in the following Table I.

TABLE I

| Solvent | Temperature | wt. % Residual Mineral Oil |
| --- | --- | --- |
| Diethylene glycol monopropyl ether | 50 | 11.3 |
| Diethylene glycol monopropyl ether | 75 | 1.4 |
| Diethylene glycol monopropyl ether | 100 | 0 |
| Diethylene glycol t-butyl methyl ether | 50 | 0 |
| Tetraethylene glycol dimethyl ether (Tetraglyme) | 50 | 46.0 |
| Tetraethylene glycol dimethyl ether (Tetraglyme) | 75 | 5.7 |
| Tetraethylene glycol dimethyl ether (Tetraglyme) | 100 | <0.2 |
| Triethylene glycol dimethyl ether (Triglyme) | 50 | 7.9 |
| Triethylene glycol dimethyl ether (Triglyme) | 75 | 0.66 |
| Triethylene glycol dimethyl ether (Triglyme) | 100 | 0 |
| Diethylene glycol dimethyl ether (Diglyme) | 50 | 0 |
| Poly(propylene glycol) Mw = 425 | 75 | 15.7 |

TABLE I-continued

| Solvent | Temperature. | wt. % Residual Mineral Oil |
|---|---|---|
| Poly(propylene glycol) Mw = 425 | 100 | 7.9 |

EXAMPLES V-VII

A 1:1 mixture of mineral oil and butyl carbitol (containing 0, 1 or 3.5 wt % water) were heated to ca. 100° C. and cooled. The two layers were separated and analyzed for mineral oil and butyl carbitol content. The results are tabulated in Table II below.

TABLE II

| | Analysis Results | | |
|---|---|---|---|
| EX. NO. | % WATER IN BUTYL CARBITOL | % BUTYL CARBITOL IN MINERAL OIL LAYER | % BUTYL CARBITOL IN CARBITOL LAYER |
| V | 0 | 6.1 | 94.2 |
| VI | 1 | 5.2 | 97.7 |
| VIII | 3.5 | 1.3 | 98.0 |

EXAMPLE VIII

A 1:1 mixture of mineral oil and propyl carbitol were heated to ca. 100° C. and cooled. The two layers were separated and analyzed for mineral oil and propyl carbitol content. The mineral oil phase analyzed for 96.5% mineral oil and 3.5% propyl carbitol. The solvent phase analyzed for 97.4% propyl carbitol and 2.6% mineral oil.

EXAMPLE IX

A 1:1 mixture mineral oil and tetraglyme was heated to ca. 100° C. and cooled. The two layers were separated and analyzed for mineral oil content. The mineral oil content analyzed for 95.8% mineral oil and 1.5% tetraglyme. The solvent layer contained 98.5% tetraglyme and 1.5% mineral oil.

What is claimed is:

1. A process for extracting a first spinning solvent from a solution spun fiber, said process comprises the steps of:
   (a) contacting said fiber containing a first spinning solvent with a second extraction solvent at a first temperature, $T_1$, said second extraction solvent selected such that said first spinning solvent is soluble or substantially soluble in said second extraction solvent at said first temperature, $T_1$, and is insoluble or is substantially insoluble in said second extraction solvent at a second temperature $T_2$, for a time sufficient to extract all or a portion of said first spinning solvent from said fiber, to form a fiber of indefinite length containing said second extraction solvent and a solution of said extracted first spinning solvent in said extraction second solvent;
   (b) separating said fiber from said solution;
   (c) subjecting said solution of said first spinning solvent and said second extraction solvent to said second temperature, $T_2$, to form a heterogeneous liquid mixture comprising two distinct liquid phases, a first liquid phase comprising predominantly said first spinning solvent and a second liquid phase comprising predominantly said second extraction solvent;
   (d) separating said first and second phases; and
   (e) recycling said second liquid phase to said contacting step (a).

2. An improved process for solution spinning of polymeric fibers of the type which comprises the steps of forming a solution of a polymer of fiber forming molecular weight in a first spinning solvent; extruding said solution through an aperture, said solution being at a temperature upstream of said aperture which is greater than the temperature at which a rubbery gel is formed and being substantially at a first concentration both upstream and downstream of said aperture; cooling the solution adjacent to and downstream of the aperture to a temperature below the temperature at which a rubbery gel is formed, forming a gel containing said first spinning solvent of substantially indefinite length; extracting the gel containing said first spinning solvent with a second, volatile extraction solvent for a sufficient contact time to form a fibrous structure containing said second extraction solvent, which gel is substantially free of first said spinning solvent and is of substantially indefinite length; drying the fibrous structure containing said second extraction solvent to form a xerogel of substantially indefinite length free of said first spinning solvent and said second extraction solvent; and stretching at least one of, the gel containing said first spinning solvent, the fibrous structure containing said second extraction solvent and, the xerogel; said improvement comprising the steps of:
   (a) contacting said gel containing said first spinning solvent with said second extraction solvent at a first temperature, $T_1$, said second extraction solvent selected such that said first spinning solvent is soluble or substantially soluble in said second extraction solvent at said first temperature and said first spinning solvent is insoluble or substantially insoluble in said second extraction solvent at said first temperature, $T_2$, for a contact time to form a fibrous structure containing predominantly said second extraction solvent and a first solution of said first spinning solvent and said second extraction solvent;
   (b) separating said structure and said first solution;
   (c) subjecting said first solution to said second temperature to form a heterogeneous liquid mixture comprising two distinct liquid phases, a first liquid phase comprising predominantly said first spinning solvent and a second liquid phase comprising predominantly said second extraction solvent;
   (d) separating said first and second phases; and
   (e) recycling said first phase to said spinning solution forming step and recycling said second phase to said extracting step.

3. A process according to claim 2 wherein said fiber is a poly(ethylene) fiber.

4. A process according to claim 3 wherein said poly(ethylene) has a molecular weight equal to or greater than about 500,000.

5. A process according to claim 4 wherein said molecular weight is equal to or greater than about 800,000.

6. A process according to claim 4 wherein said first spinning solvent is a hydrocarbon.

7. A process according to claim 6 wherein said spinning solvent is selected from the group consisting of mineral oil, paraffin oil, decalin and poly(ethylene) wax.

8. A process according to claim 7 wherein said spinning solvent is mineral oil.

9. A process according to claim 6 wherein said second extracting solvent is a polyether.

10. A process according to claim 9 wherein said polyethers are selected from the group consisting of monoalkyl and dialkyl ethers of polyalkylene glycols having alkyl groups of from 1 to about 5 carbon atoms and having alkylene and polyalkylene glycol groups wherein individual alkylene moieties include from about 2 to about 6 carbon atoms.

11. A process according to claim 10 wherein said mono and dialkyl ethers of polyalkylene glycols are selected from the group consisting of polyethylene glycol ethers and polypropylene glycol ethers of the formula:

$$R(OCH_2CH_2)_xOR^1 \text{ and } R(OCH_2CH(CH_3))_xOR^1$$

wherein:

x is an integer from 1 to about 8; and

R and R' are the same or different and are hydrogen or alkyl having 1 to about 4 carbon atoms.

12. A process according to claim 11 wherein said first spinning solvent is mineral oil.

13. A process according to claim 12 wherein said polyether solvents are polyethylene glycol ethers of the formula:

$$R(OCH_2CH_2)_xOR^1$$

wherein:

x is an interger from about 2 to about 5; and

R and $R^1$ are the same or different and are hydrogen, methyl, ethyl, propyl or butyl, with the proviso that at least one of R and $R^1$ is other than hydrogen.

14. A process according to claim 13 wherein said mono- and dialkyl ethers of poly alkylene glycols are selected from the group consisting of tetraethylene glycol dimethyl ether, triethylene glycol dimethyl ether, diethylene glycol monobutyl ether and diethylene glycol mono propyl ether.

15. A process according to claim 14 wherein said alkyl and dialkyl ethers of polyalkylene glycols are selected from the group consisting of diethylene glycol monobutyl ether and diethylene glycol monopropyl ether.

16. A process according to claim 14 wherein said first temperature is from 55° C. about to 100° C.

17. A process according to claim 16 wherein said first temperature is from about 75° C. to about 100° C.

18. A process according to claim 16 wherein said second temperature is from about 0° C. to about 45° C.

19. A process according to claim 18 wherein said second temperature is from about 0° C. to about 25° C.

20. The process of claim 19 wherein said spinning solvent contains less than about 20% by weight or second extraction solvent.

21. The process of claim 20 wherein said spinning solvent contains less than about 15% by weight of second extraction solvent.

22. The process of claim 21 wherein said spinning solvent contains less than about 10% by weight of second extraction solvent.

23. The process of claim 22 wherein said spinning solvent contains less than about 5% by weight of second extraction solvent.

24. The process of claim 23 wherein said spinning solvent contains less than about 2% by weight of second extraction solvent.

* * * * *

UNITED STATES PATENT AND TRADEMARK OFFICE
CERTIFICATE OF CORRECTION

PATENT NO. : 5,213,745
DATED : May 25, 1993
INVENTOR(S) : Izod et al.

It is certified that error appears in the above-identified patent and that said Letters Patent is hereby corrected as shown below:

Col. 15, line 53, insert --,-- between "temperature" and "$T_2$"

Col. 18, line 20, "weight or" should read "weight of"

Signed and Sealed this

Eighth Day of February, 1994

Attest:

BRUCE LEHMAN

Attesting Officer

Commissioner of Patents and Trademarks